United States Patent
Fujimoto (10) Patent No.: US 7,498,765 B2
(45) Date of Patent: Mar. 3, 2009

(54) METHOD OF CONTROLLING CHARGING SECONDARY BATTERY BASED ON TYPE OF SECONDARY BATTERY AND APPARATUS

(75) Inventor: Mikihiro Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 10/938,089

(22) Filed: Sep. 10, 2004

(65) Prior Publication Data
US 2005/0057217 A1  Mar. 17, 2005

(30) Foreign Application Priority Data
Sep. 12, 2003  (JP) ............................... 2003-321977

(51) Int. Cl.
*H01M 10/46* (2006.01)
(52) U.S. Cl. ..................................... 320/106
(58) Field of Classification Search ................. 320/106, 320/107, 110, 112
See application file for complete search history.

(56) References Cited

U.S. PATENT DOCUMENTS 5,672,953 A  9/1997  Kim
5,686,815 A * 11/1997  Reipur et al. ............... 320/116
5,909,101 A *  6/1999  Matsumoto et al. ......... 320/110

FOREIGN PATENT DOCUMENTS

| CN | 1130819 | 9/1996 |
|---|---|---|
| CN | 1045233 | 9/1999 |
| JP | 02-299428 A | 12/1990 |
| JP | 08-293328 A | 11/1996 |
| JP | 11-252808 | 9/1999 |
| JP | 2002-320341 A | 10/2002 |

* cited by examiner

*Primary Examiner*—Edward Tso
(74) *Attorney, Agent, or Firm*—Canon USA Inc I.P. Div (57) ABSTRACT

A rechargeable battery charging apparatus includes a type detection section for determining the type of rechargeable battery, a power-supply section for charging the rechargeable battery, and a charging control section for controlling the power-supply section. The charging control section stops the charging of the rechargeable battery or changes the limitation value of the charging current when it is detected by the type detection section that the type of the rechargeable battery is changed during charging.

8 Claims, 6 Drawing Sheets

METHOD OF CONTROLLING CHARGING SECONDARY BATTERY BASED ON TYPE OF SECONDARY BATTERY AND APPARATUS

BACKGROUND OF THE INVENTION

1. Field of the Invention

The present invention relates to a secondary battery (rechargeable battery) charging method and apparatus compatible with a plurality of types of secondary batteries.

2. Description of the Related Art

Hitherto, a secondary battery charging apparatus, in which, when some abnormality is detected during charging, the charging being performed is stopped or the limitation value of charging current is changed, has been known.

More specifically, as disclosed in, for example, Japanese Patent Laid-Open No. 11-252808, there is a secondary battery charging apparatus in which, when an abnormal cooling occurs, charging/discharging electrical power is changed according to the cooling performance difference between an abnormal cooling state and a normal cooling state.

However, in the above-described conventional secondary battery charging apparatus, an operation for changing the charging/discharging electrical power is performed after some abnormality occurs in the charging operation. Although security can be ensured, when the influence upon the apparatus is considered, it is preferable that an occurrence of an abnormality be predicted before an abnormality occurs, and countermeasures be performed.

SUMMARY OF THE INVENTION

Accordingly, an object of the present invention is to provide a secondary battery charging method and apparatus capable of preventing an occurrence of an abnormality during charging.

To achieve the above-mentioned object, the present invention provides a secondary (rechargeable) battery charging method including the steps of: a determination step of determining the type of rechargeable battery; a charging step of charging the rechargeable battery; and a control step of controlling the charging step, wherein the control step stops the charging operation when it is detected in the determination step that the type of the rechargeable battery is changed during charging in the charging step.

Further objects, features and advantages of the present invention will become apparent from the following description of the preferred embodiments with reference to the attached drawings.

DESCRIPTION OF THE PREFERRED EMBODIMENTS

Embodiments of a secondary battery charging method and apparatus of the present invention will now be described below with reference to the drawings.

First Embodiment

A first embodiment of the present invention will be described below first with reference to FIGS. 1 and 2.

Figure 1:
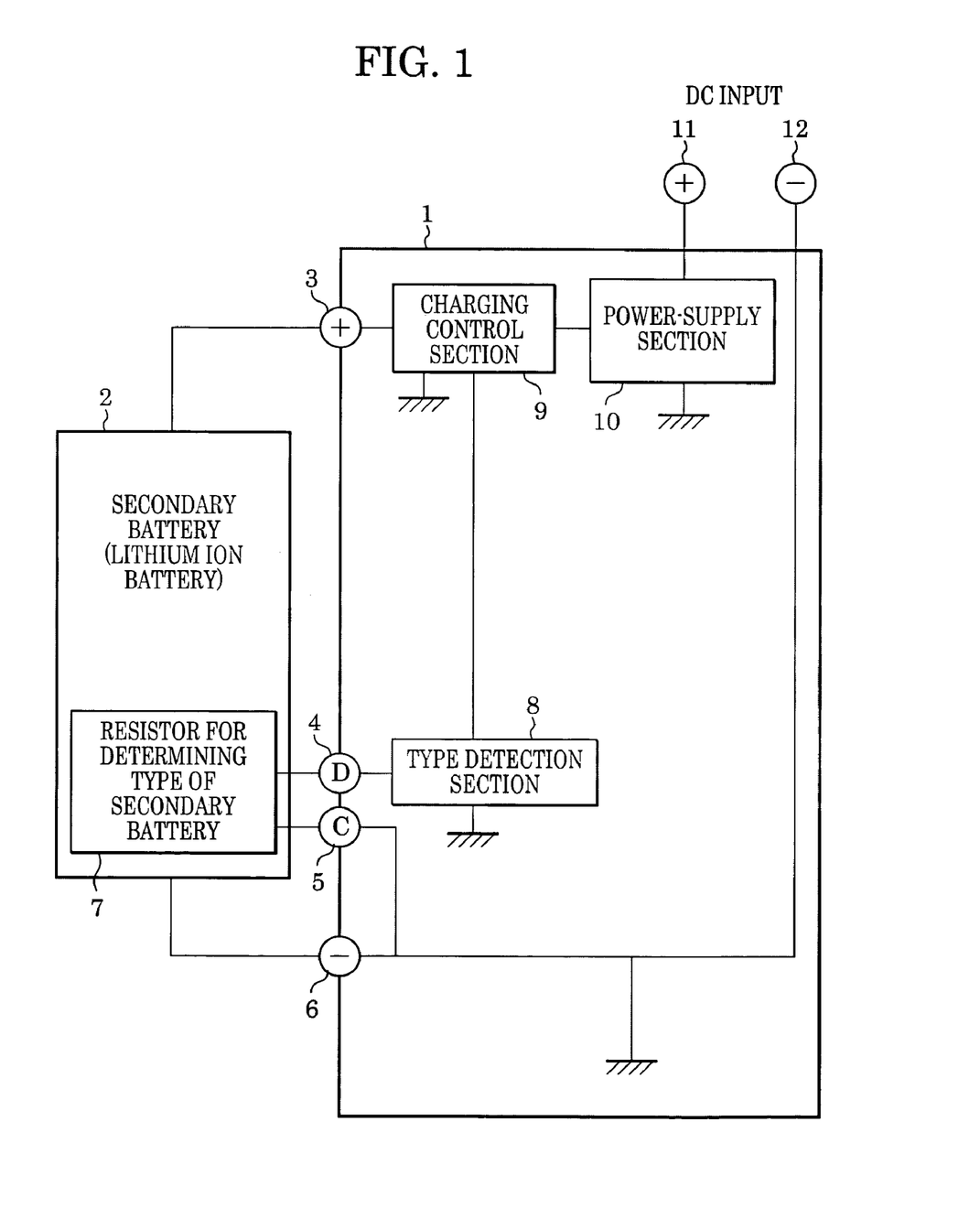
FIG. 1 is a block diagram showing the configuration of a secondary battery charging apparatus according to a first embodiment of the present invention.

FIG. 1 is a block diagram showing the configuration of a secondary battery charging apparatus according to the first embodiment of the present invention. Shown in FIG. 1 are a secondary battery charging apparatus 1, a secondary battery (rechargeable battery) 2, a positive (+) terminal 3 for supplying charging power, a D terminal 4 for detecting the type of secondary battery, a C terminal 5 for detecting the type of secondary battery, a negative (−) terminal 6 for supplying charging power, a resistor 7 for determining the type of secondary battery, a type detection section 8, a charging control section 9, a power-supply section 10, a DC input positive (+) terminal 11, and a DC input negative (−) terminal 12.

The secondary battery charging apparatus 1 and the secondary battery 2 are connected at the positive terminal 3, the negative terminal 6, the D terminal 4, and the C terminal 5, with the secondary battery 2 being loadable into and removable from the secondary battery charging apparatus 1.

There are a plurality of types (capacitances and cell characteristics) of secondary batteries 2, and the settings of the limitation value of the charging current and the charging time are changed according to the type of the secondary battery. In order to enable the secondary battery charging apparatus 1 to recognize the type of the secondary battery 2, the secondary battery type determination resistor 7, inside the secondary battery 2, is set between the D terminal 4 and the C terminal 5 so as to have a predetermined resistance value.

In the secondary battery charging apparatus 1, the type detection section 8 makes a predetermined electrical current flow through the secondary battery type determination resistor 7 and measures a voltage generated between the D terminal 4 and the C terminal 5 (hereinafter, this voltage is referred to as a "secondary battery type determination signal"), making it possible to determine the type of the secondary battery.

The charging control section 9 limits the charging current, the charging voltage, and the charging time according to the type of the secondary battery 2 determined in the type detection section 8, and starts and stops charging. The DC input positive (+) terminal 11 and the DC input negative (−) terminal 12 are blocks for externally supplying electrical power required for charging. In the power-supply section 10, the electrical power is changed to a voltage suitable for charging and the operation power for the secondary battery charging apparatus 1.

Next, the operation of the secondary battery charging apparatus 1 according to this embodiment will be described with reference to FIG. 2.

Figure 2:
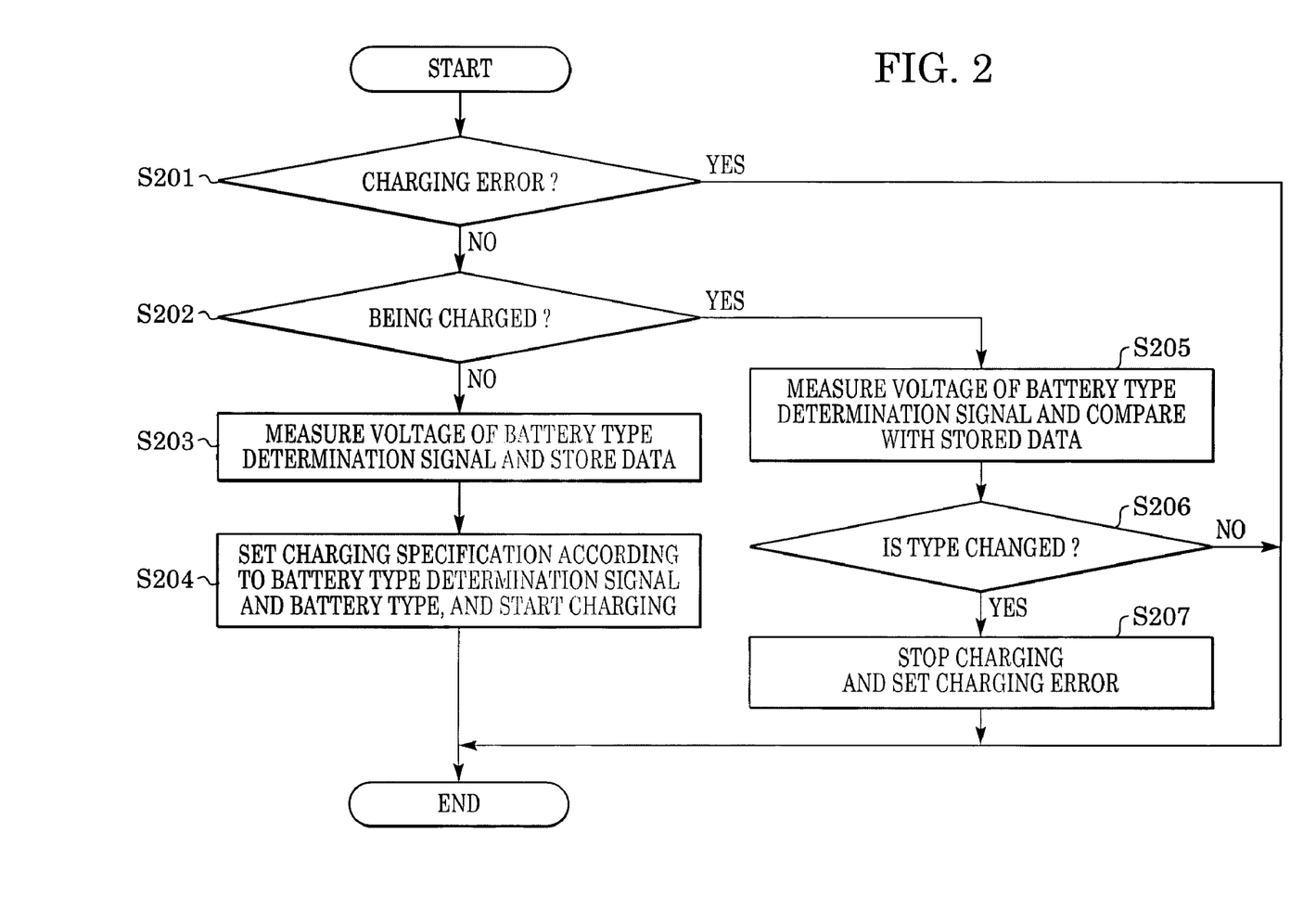
FIG. 2 is a flowchart showing the operation flow of the secondary battery charging apparatus according to the first embodiment of the present invention.

FIG. 2 is a flowchart showing the operation flow of the secondary battery charging apparatus 1 according to this embodiment. The processing based on this flowchart operates at predetermined time intervals.

In FIG. 2, initially, in step S201, it is determined whether or not the setting content of the secondary battery charging apparatus 1 is in a charging error state. When it is determined that the setting content is in a charging error state, this processing operation is terminated without performing further processing. When it is determined that the setting content is not in a charging error state, the process proceeds to the subsequent step S202.

In step S202, it is determined whether or not the secondary battery charging apparatus 1 is being charged. When it is determined that the secondary battery charging apparatus 1 is not being charged, the process proceeds to step S203, where the type detection section 8 measures the voltage of the secondary battery type determination signal, and also the value (data) of the measured voltage of the secondary battery type determination signal is stored in a storage section (not shown). Thereafter, the process proceeds to step S204.

In step S204, the setting of the charging specification is performed according to the value (data) of the voltage of the secondary battery type determination signal measured in step S203 above, and the charging control section 9 starts charging.

On the other hand, when it is determined in step S202 above that the secondary battery charging apparatus 1 is being charged or charging has started, the process proceeds to step S205, where the type detection section 8 measures the voltage of the secondary battery type determination signal, and also, the value (data) of the measured voltage of the secondary battery type determination signal is compared with the value (data) of the voltage of the secondary battery type determination signal stored in the storage section.

Next, in step S206, if the difference of the values (data) of the voltages compared in step S205 above is a predetermined value or more, it is determined that the type of the secondary battery 2 has changed for some reason, and the process proceeds to step S207, where the charging of the secondary battery 2 is stopped, and also a charging error is set. Thereafter, this processing operation is completed.

On the other hand, when it is determined in step S206 above that the type of the secondary battery 2 has not changed, this processing operation is immediately completed without performing further processing.

As has thus been described in detail, according to the secondary battery charging apparatus 1 of this embodiment, when the change of the secondary battery 2 is detected during charging, an accident of charging the secondary battery 2 can be prevented by stopping the charging of the secondary battery 2.

Second Embodiment

A second embodiment of the present invention will now be described below with reference to FIG. 3.

The basic configuration of the secondary battery charging apparatus according to this embodiment is identical to that of the above-described first embodiment in FIG. 1, and accordingly, a description thereof is given by also using FIG. 1.

The operation of the secondary battery charging apparatus 1 according to this embodiment will now be described below with reference to FIG. 3.

Figure 3:
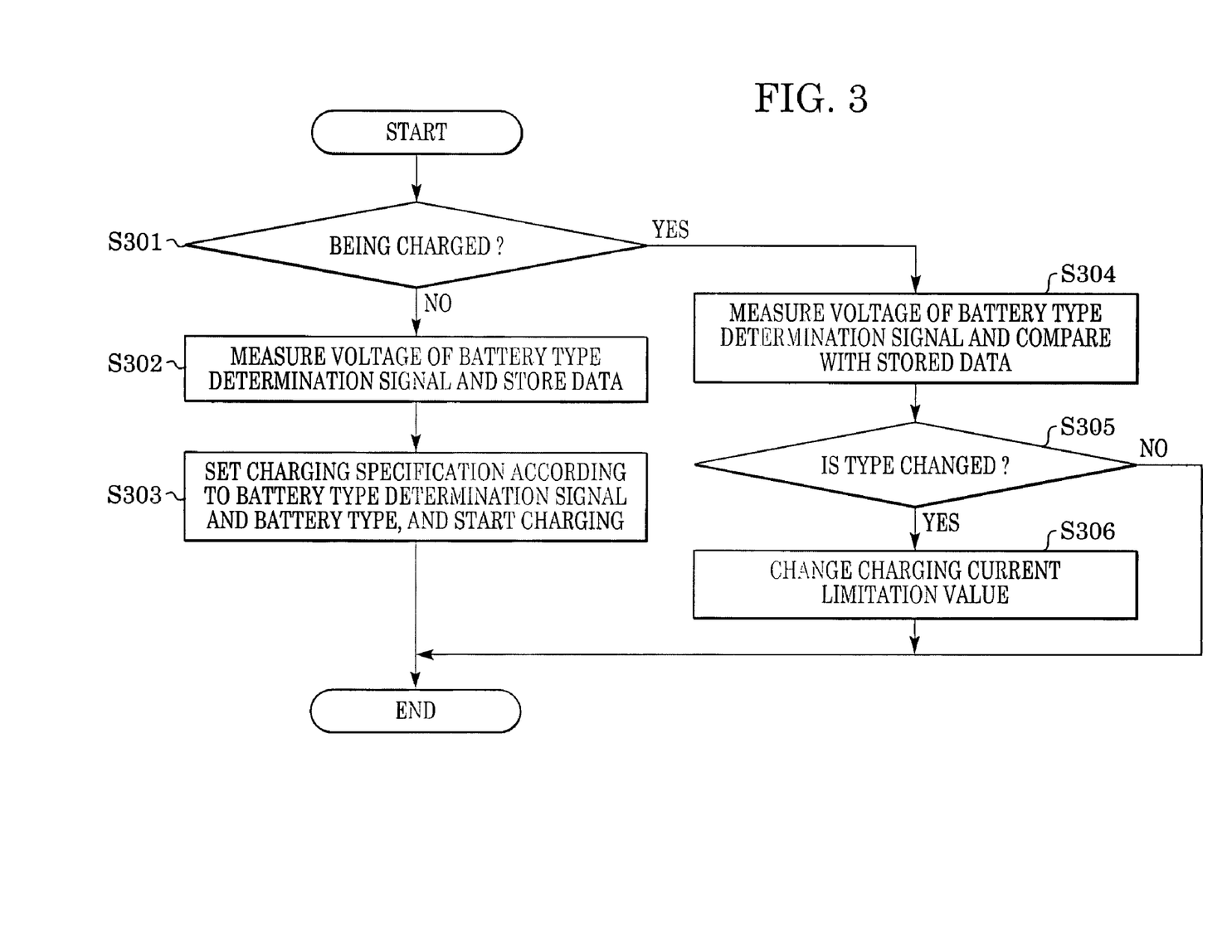
FIG. 3 is a flowchart showing the operation flow of a secondary battery charging apparatus according to a second embodiment of the present invention.

FIG. 3 is a flowchart showing the operation flow of the secondary battery charging apparatus 1 according to this embodiment. The processing based on this flowchart operates at predetermined time intervals.

In FIG. 3, initially, in step S301, it is determined whether or not the secondary battery charging apparatus 1 is being charged. When it is determined that the secondary battery charging apparatus 1 is not being charged, the process proceeds to the subsequent step S302, where the type detection section 8 measures the voltage of the secondary battery type determination signal, and also, the value (data) of the measured voltage of the secondary battery type determination signal is stored in a storage section (not shown). The process then proceeds to step S303.

In step S303, the type of the secondary battery 2 is determined on the basis of the value (data) of the voltage of the secondary battery type determination signal, which is measured in step S302 above, and setting to the charging specification corresponding to the determined secondary battery 2 is performed. Also, after the charging of the secondary battery 2 is started, this processing operation is completed.

On the other hand, when it is determined in step S301 that the secondary battery charging apparatus 1 is being charged, the process proceeds to step S304, where the type detection section 8 measures the voltage of the secondary battery type determination signal, and compares the value (data) of the measured voltage of the secondary battery type determination signal with the value (data) of the voltage of the secondary battery type determination signal, which is measured before charging, the value (data) being stored in the storage section in step S302 above. The process then proceeds to step S305.

In step S305, if the difference of the values (data) of the voltages of the secondary battery type determination signals compared in step S304 above is a predetermined value or more, it is determined that the type of the secondary battery 2 has changed for some reason, and the process proceeds to step S306, where the limitation value of the charging current is changed, and then this processing operation is completed.

On the other hand, when it is determined in step S305 above that the type of the secondary battery 2 has not changed, this processing operation is completed without performing further processing.

As has thus been described in detail, according to the secondary battery charging apparatus 1 of this embodiment, when the change of the secondary battery 2 is detected during charging, an accident of charging the secondary battery 2 can be prevented by changing the limitation value of the charging current.

Third Embodiment

A third embodiment of the present invention will now be described below with reference to FIG. 4.

The basic configuration of the secondary battery charging apparatus according to this embodiment is identical to that of the above-described first embodiment in FIG. 1, and accordingly, a description thereof is given by also using FIG. 1.

The operation of the secondary battery charging apparatus 1 according to this embodiment will now be described below with reference to FIG. 4.

Figure 4:
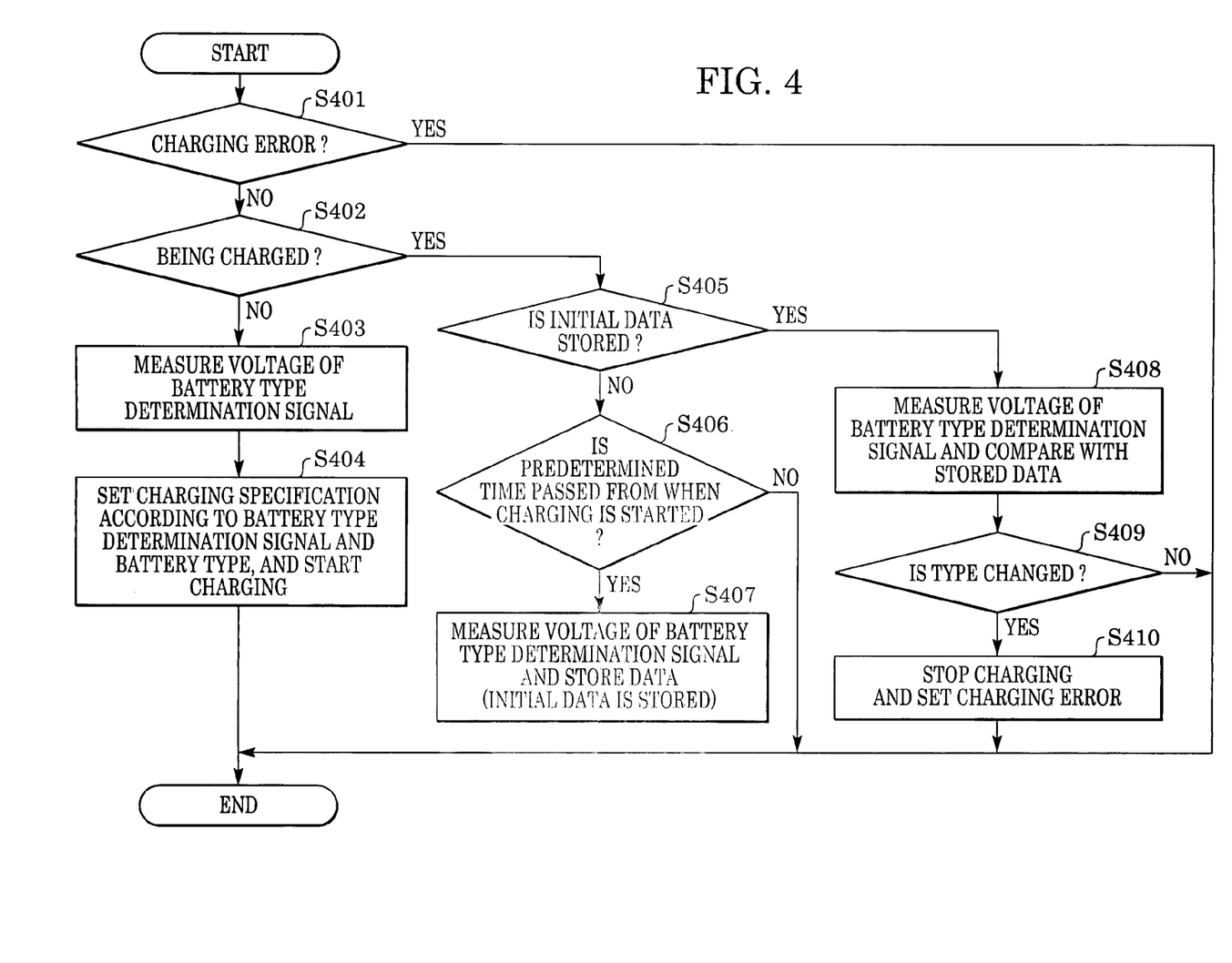
FIG. 4 is a flowchart showing the operation flow of a secondary battery charging apparatus according to a third embodiment of the present invention.

FIG. 4 is a flowchart showing the operation flow of the secondary battery charging apparatus 1 according to this embodiment. The processing based on this flowchart operates at predetermined time intervals.

In FIG. 4, initially, in step S401, it is determined whether or not the setting content of the secondary battery charging apparatus 1 is in a charging error state. When it is determined that the setting content is in a charging error state, this processing operation is terminated without performing further processing. When it is determined that the setting content is not in a charging error state, the process proceeds to the subsequent step S402.

In step S402, it is determined whether or not the secondary battery charging apparatus 1 is being charged. When it is determined that the secondary battery charging apparatus 1 is not being charged or charging has not started, the process proceeds to step S403, where the type detection section 8 measures the voltage of the secondary battery type determination signal, and the process proceeds to step S404.

In step S404, the setting of the charging specification is performed according to the value (data) of the voltage of the secondary battery type determination signal, which is measured in step S403 above, and also, the charging control section 9 starts charging.

On the other hand, when it is determined in step S402 above that the secondary battery charging apparatus 1 is being charged, the process proceeds to step S405, where the voltage value of the secondary battery type determination signal into a storage section (not shown) is stored. When it is determined that the voltage value of the secondary battery type determination signal is not stored in the storage section, the process proceeds to step S406, where it is determined whether or not a predetermined time has passed from when the charging was started. When it is determined that the predetermined time has not passed from when the charging was started, this processing operation is terminated without performing further processing. On the other hand, when it is determined that the predetermined time has passed from when the charging was started, the process proceeds to step S407, where the voltage of the secondary battery type determination signal is measured, and the value (data) of the measured voltage of the secondary battery type determination signal is stored in the storage section. Thereafter, this processing operation is completed.

On the other hand, when it is determined in step S405 above that the voltage value of the secondary battery type determination signal is stored in the storage section, the process proceeds to step S408, where the type detection section 8 measures the voltage of the secondary battery type determination signal and also, the value (data) of the measured voltage of the secondary battery type determination signal is compared with the value (data) of the voltage of the secondary battery type determination signal, which is stored in the storage section. Thereafter, the process proceeds to step S409.

In step S409, it is determined whether or not the difference of the values (data) of the voltages of the secondary battery type determination signals, which are compared in step S408 above, is a predetermined value or more. When it is determined that the difference is less than the predetermined value, this processing operation is terminated. When it is determined that the difference is the predetermined value or more, determining that the type of the secondary battery 2 is changed, the process proceeds to step S410, where the charging of the secondary battery 2 is stopped, and a charging error is set. Thereafter, this processing operation is terminated.

As has thus been described in detail, according to the secondary battery charging apparatus 1 of this embodiment, when the change of the secondary battery 2 is detected during charging, an accident of charging the secondary battery 2 can be prevented by stopping the charging of the secondary battery 2.

Fourth Embodiment

A fourth embodiment of the present invention will now be described below with reference to FIG. 5.

The basic configuration of the secondary battery charging apparatus according to this embodiment is identical to that of the above-described first embodiment in FIG. 1, and accordingly, a description thereof is given by also using FIG. 1.

The operation of the secondary battery charging apparatus 1 according to this embodiment will now be described below with reference to FIG. 5.

Figure 5:
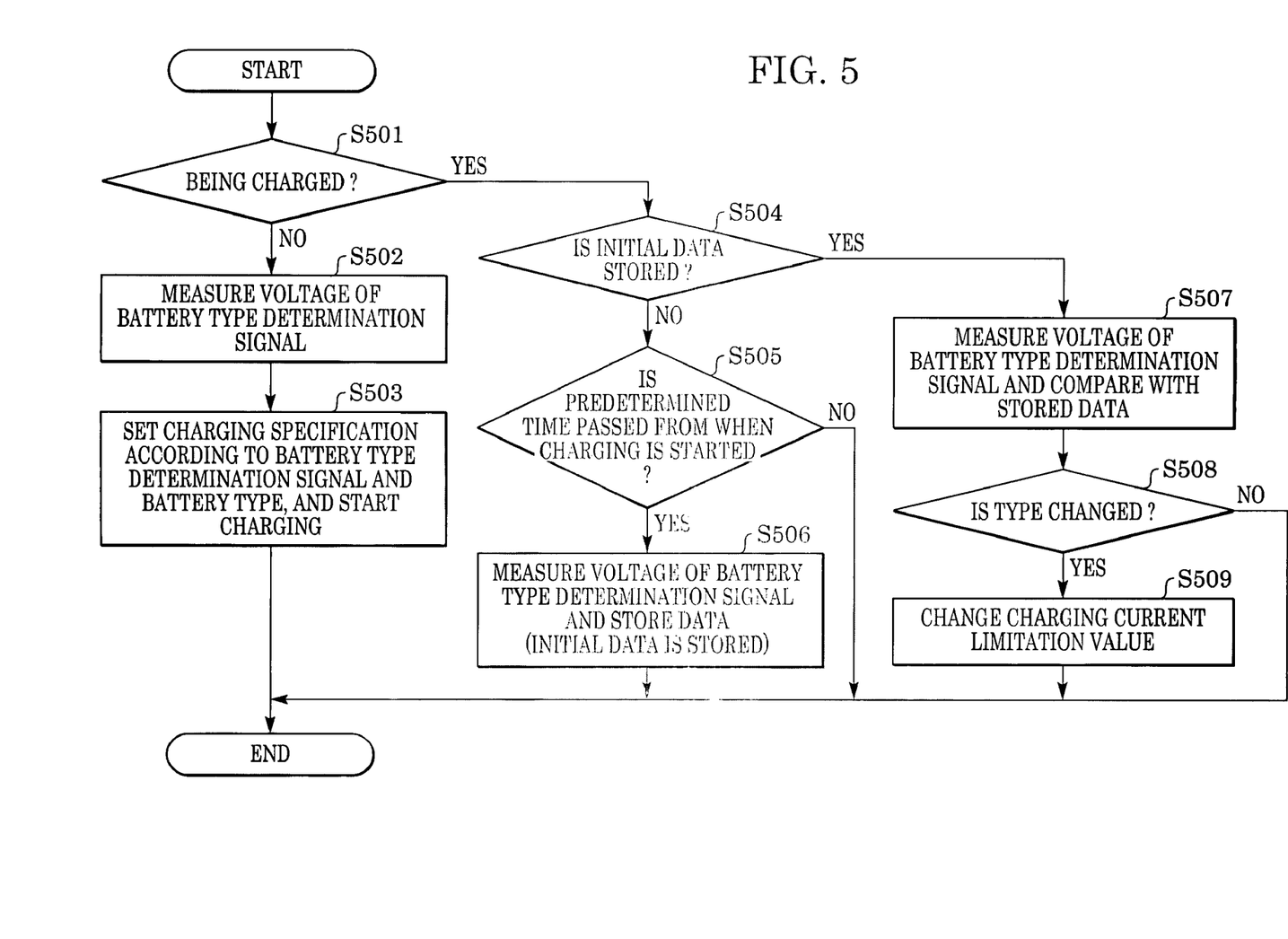
FIG. 5 is a flowchart showing the operation flow of a secondary battery charging apparatus according to a fourth embodiment of the present invention.

FIG. 5 is a flowchart showing the operation flow of the secondary battery charging apparatus 1 according to this embodiment. The processing based on this flowchart operates at predetermined time intervals.

In FIG. 5, initially, in step S501, it is determined whether or not the secondary battery charging apparatus 1 is being charged. When it is determined that the secondary battery charging apparatus 1 is not being charged, the process proceeds to step S502.

In step S502, the type detection section 8 measures the voltage of the secondary battery type determination signal, and then the process proceeds to the subsequent step S503, where the setting of the charging specification is performed according to the voltage value of the secondary battery type determination signal, which is measured in step S502 above, and also, the charging control section 9 starts charging.

On the other hand, when it is determined in step S501 above that the secondary battery charging apparatus 1 is being charged, the process proceeds to step S504, where it is determined whether or not the value (data) of the voltage of the secondary battery type determination signal is stored in a storage section (not shown). When it is determined that the value (data) of the voltage of the secondary battery type determination signal is stored in the storage section, the process proceeds to step S505, where it is determined whether or not a predetermined time has passed from when the charging was started. When it is determined that the predetermined time has not passed, this processing operation is terminated. When it is determined that the predetermined time has passed, the process proceeds to step S506, where the voltage of the secondary battery type determination signal is measured, and the value (data) of the measured voltage of the secondary battery type determination signal is stored in the storage section (not shown). Thereafter, this processing operation is completed.

On the other hand, when it is determined in step S504 that the value (data) of the voltage of the secondary battery type determination signal is stored in the storage section, the process proceeds to step S507, where the type detection section 8 measures the voltage of the secondary battery type determination signal, and also the value (data) of the measured voltage of the secondary battery type determination signal is compared with the value (data) of the voltage of the secondary battery type determination signal stored in the storage section. Thereafter, the process proceeds to the subsequent step S508.

In step S508, it is determined whether or not the difference of the values (data) of the voltages compared in step S507 above is a predetermined value or more. When it is determined that the difference is less than the predetermined value, this processing operation is terminated. When it is determined that the difference is the predetermined value or more, determining that the type of the secondary battery 2 is changed, the process proceeds to the subsequent step S509, where the charging current limitation value is changed. Thereafter, this processing operation is terminated.

As has thus been described in detail, according to the secondary battery charging apparatus 1 of this embodiment, when the change of the secondary battery 2 is detected during charging, an accident of charging the secondary battery 2 can be prevented by changing the limitation value of the charging current.

Fifth Embodiment

A fifth embodiment of the present invention will now be described below with reference to FIG. 6.

The basic configuration of the secondary battery charging apparatus according to this embodiment is identical to that of the above-described first embodiment in FIG. 1, and accordingly, a description thereof is given by also using FIG. 1.

The operation of the secondary battery charging apparatus 1 according to this embodiment will now be described below with reference to FIG. 6.

Figure 6:
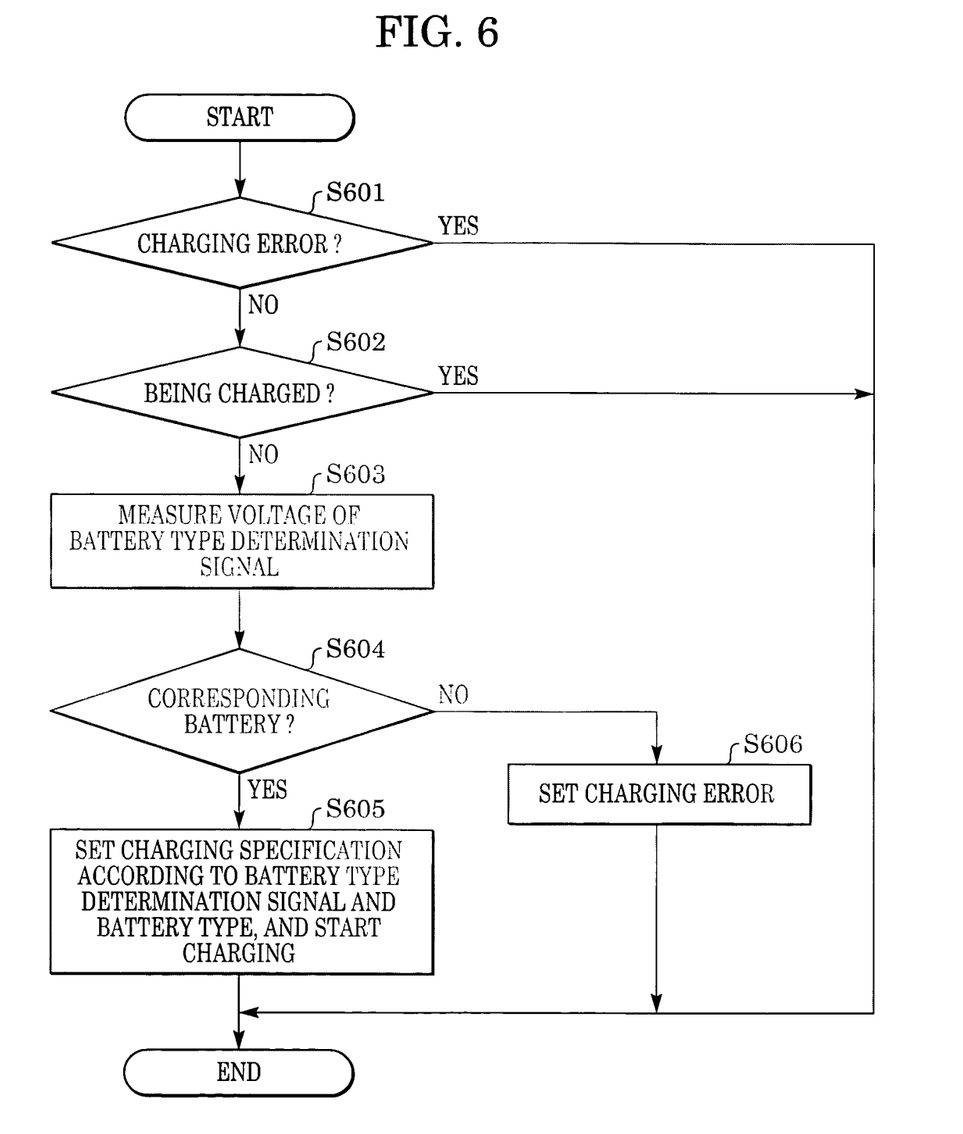
FIG. 6 is a flowchart showing the operation flow of a secondary battery charging apparatus according to a fifth embodiment of the present invention.

FIG. 6 is a flowchart showing the operation flow of the secondary battery charging apparatus 1 according to this embodiment. The processing based on this flowchart operates at predetermined time intervals.

In FIG. 6, initially, in step S601, it is determined whether or not the setting content of the secondary battery charging apparatus 1 is in a charging error state. When it is determined that the setting content is in a charging error state, this processing operation is terminated without performing further processing. When it is determined that the setting content is not in a charging error state, the process proceeds to the subsequent step S602.

In step S602, it is determined whether or not the secondary battery charging apparatus 1 is being charged. When it is determined that the secondary battery charging apparatus 1 is not being charged, the process proceeds to step S603, where the type detection section 8 measures the voltage of the secondary battery type determination signal, and the process proceeds to the subsequent step S604.

In step S604, it is determined whether or not the voltage value of the secondary battery type determination signal, which is measured in step S603 above, is a value to which the secondary battery charging apparatus 1 corresponds. When it is determined that the voltage value is a corresponding value, the process proceeds to step S605, where the setting of the charging specification is performed according to the secondary battery determined on the basis of the measured value, and also, the charging control section 9 starts charging.

On the other hand, when it is determined in step S604 above that the voltage value of the secondary battery type determination signal, which is measured in step S603 above, is a value to which the secondary battery charging apparatus 1 does not correspond, a charging error is set. Thereafter, this processing operation is terminated.

As has thus been described in detail, according to the secondary battery charging apparatus 1 of this embodiment, a charging accident can be prevented by not starting charging of the secondary battery to which the secondary battery charging apparatus 1 does not correspond.

Other Embodiments

The foregoing are the embodiments of the present invention. The present invention is not limited to these embodiments, and can be applied to any configuration as long as the functions described in the claims or the functions possessed by the configuration of the embodiments can be achieved.

The object of the present invention can also be achieved in such a manner that a storage medium in which program code of software for realizing the functions of the above-described embodiments is stored is supplied to a system or an apparatus, and a computer (or a CPU, an MPU) of the system or the apparatus reads and executes the program code stored in the storage medium.

For the storage medium for supplying program code, for example, a flexible disk, a hard disk, an optical disk, a magneto-optical disk, a CD-ROM, a CD-R, a magnetic tape, a nonvolatile memory card, a ROM, etc., can be used.

The case in which the functions of the above-described embodiments are realized by executing program code read by the computer, and also the case in which the OS (Operating System) running on the computer performs part or the whole of the actual processing in accordance with the instructions of the program code, and the functions of the above-described embodiments are realized by the processing are within the scope of the present invention.

Furthermore, the case in which the program code read from the storage medium is written into a memory provided in a function expansion board inserted into a computer or a function expansion unit connected to a computer, and thereafter, for example, a CPU provided in the function expansion board or the function expansion unit performs part or the whole of the actual processing in accordance with the instructions of the program code, and the functions of the above-described embodiments are realized by the processing is within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-321977 filed Sep. 12, 2003, which is hereby incorporated by reference herein.

What is claimed is:

1. A rechargeable battery charging method comprising:
   a determination step of determining the type of rechargeable battery;
   a charging step of charging said rechargeable battery; and
   a control step of controlling said charging step,
   wherein said control step stops the charging operation when it is detected in said determination step that the type of said rechargeable battery is changed during charging in said charging step.

2. The rechargeable battery charging method according to claim 1, further comprising a determination signal determination step of determining a determination signal for determining the type of said rechargeable battery,
   wherein said determination step determines the type of said rechargeable battery on the basis of the fact that the voltage level of said determination signal differs depending on the type of said rechargeable battery.

3. The rechargeable battery charging method according to claim 2, wherein said determination step determines that the type of said rechargeable battery is changed when the voltage of said determination signal is changed by a predetermined value or more.

4. The rechargeable battery charging method according to claim 3, further comprising:
   a storing step of storing the voltage value of said determination signal immediately before charging is started; and
   a comparison step of comparing the voltage value of said determination signal, which is stored in said storing step, with the voltage of the determination signal during charging,
   wherein said determination step determines that the type of said rechargeable battery is changed when the comparison result in said comparison step is greater than or equal to a predetermined value.

5. The rechargeable battery charging method according to claim 3, further comprising:

a storing step of storing the voltage value of said determination signal after a predetermined time has passed from when the charging was started; and a comparison step of comparing the voltage value of said determination signal, which is stored in said storing step, with the voltage of the determination signal during charging, wherein said determination step determines that the type of said rechargeable battery is changed when the comparison result in said comparison step is greater than or equal to a predetermined value.

6. A rechargeable battery charging method comprising:

storing data of a determination signal for determining a type of a rechargeable battery, wherein the determination signal is different from a voltage level of the rechargeable battery before supplying the rechargeable battery with power;

start supplying the rechargeable battery with power in accordance with the data of the determination signal stored in the storing step;

comparing data of the determination signal output from the rechargeable battery with the data of the determination signal stored in the storing step during supplying the rechargeable battery with power; and controlling to stop supplying the rechargeable battery with the power, when the difference between the output data of the determination signal and the stored data of the determination signal is more than a predetermined value.

7. The rechargeable battery charging method according to claim 6, further comprising setting to prevent restarting the power supply after the control step controls to stop the power supply.

8. The rechargeable battery charging method according to claim 6, wherein the rechargeable battery includes a resistor defining a value of the data of the determination signal.

* * * * *